US009168572B2

(12) United States Patent
Slutz

(10) Patent No.: US 9,168,572 B2
(45) Date of Patent: *Oct. 27, 2015

(54) TARP AND BALLAST SYSTEM

(71) Applicant: JMW WELDING & MANUFACTURING, INC., Canton, OH (US)

(72) Inventor: Michael W. Slutz, Bolivar, OH (US)

(73) Assignee: JMW WELDING & MANUFACTURING, INC., Canton, OH (US)

(*) Notice: Subject to any disclaimer, the term of this patent is extended or adjusted under 35 U.S.C. 154(b) by 0 days.

This patent is subject to a terminal disclaimer.

(21) Appl. No.: 14/331,932

(22) Filed: Jul. 15, 2014

(65) Prior Publication Data

US 2014/0328629 A1 Nov. 6, 2014

Related U.S. Application Data

(63) Continuation of application No. 13/524,083, filed on Jun. 15, 2012, now Pat. No. 8,777,516.

(60) Provisional application No. 61/497,634, filed on Jun. 16, 2011.

(51) Int. Cl.
*B09B 5/00* (2006.01)
*B32B 3/02* (2006.01)
*B32B 3/14* (2006.01)
*B09B 1/00* (2006.01)

(52) U.S. Cl.
CPC ............. *B09B 1/004* (2013.01); *Y02W 30/32* (2015.05); *Y10T 29/49826* (2015.01); *Y10T 428/24008* (2015.01)

(58) Field of Classification Search
CPC ........................................................ B09B 1/004
See application file for complete search history.

(56) References Cited

U.S. PATENT DOCUMENTS

| 905,674 | A | 12/1908 | Elliot |
| 1,106,624 | A | 8/1914 | Cadwallader et al. |
| 1,786,048 | A | 12/1930 | Williams |
| 2,413,061 | A | 12/1946 | McKee at al. |
| 2,754,900 | A | 7/1956 | Karobonik et al. |
| 3,785,694 | A | 1/1974 | Sargent |
| 4,050,972 | A | 9/1977 | Cardinal, Jr. |

(Continued)

FOREIGN PATENT DOCUMENTS

| DE | 3330897 | 3/1985 |
| DE | 3641780 | 9/1987 |

(Continued)

OTHER PUBLICATIONS tarpARMOR Brochure; tarpLOX; Structural Tarp Support System; Feb. 10, 2009; 1 page.

*Primary Examiner* — Tara M. Pinnock
(74) *Attorney, Agent, or Firm* — Martin & Ferraro, LLP

(57) ABSTRACT

An improved tarp and ballast system that includes a plurality of panels attached to one another along the lengths thereof, wherein the lengths of the panels correspond to the length of the tarp. The tarp also includes chain pockets located at the sides of the tarp which run the length of the tarp and have chains secured therein. The tarp further includes a plurality of cable pockets and associated ballast anchors oriented across the width of the tarp which are adapted to secure a plurality of ballast cables to the tarp.

19 Claims, 4 Drawing Sheets

(56) References Cited

U.S. PATENT DOCUMENTS

| | | |
|---|---|---|
| 4,068,404 A | 1/1978 | Sheldon |
| 4,455,790 A | 6/1984 | Curle |
| 4,478,012 A | 10/1984 | Fraioli |
| 4,578,908 A | 4/1986 | Ishler |
| 4,590,714 A | 5/1986 | Walker |
| 4,720,212 A | 1/1988 | Steenbergen et al. |
| 4,878,322 A | 11/1989 | Ikeda et al. |
| 4,909,667 A | 3/1990 | DeMello |
| 4,927,317 A | 5/1990 | Acosta |
| 5,180,203 A | 1/1993 | Goudy |
| 5,291,698 A | 3/1994 | Rayner, Jr. |
| 5,304,014 A | 4/1994 | Slutz |
| 5,536,116 A | 7/1996 | Lammers et al. |
| 5,630,735 A | 5/1997 | Eckert |
| 5,660,402 A | 8/1997 | Jones et al. |
| 5,716,165 A | 2/1998 | Burgert |
| 5,765,901 A | 6/1998 | Wilkens |
| 5,966,877 A | 10/1999 | Hawes |
| 6,007,138 A | 12/1999 | Cramaro |
| 6,142,554 A | 11/2000 | Carroll et al. |
| 6,474,022 B1 | 11/2002 | Double et al. |
| 6,502,890 B1 | 1/2003 | Fliege et al. |
| 6,558,079 B1 | 5/2003 | Kozak et al. |
| 6,558,080 B2 | 5/2003 | Kozak |
| 6,575,393 B1 | 6/2003 | James, Jr. |
| 6,769,142 B2 | 8/2004 | Ragsdale et al. |
| 6,786,676 B1 | 9/2004 | Pitcher |
| 6,865,754 B2 | 3/2005 | MacLean et al. |
| 6,981,734 B2 | 1/2006 | Martin |
| 7,018,135 B2 | 3/2006 | Kaul et al. |
| 7,285,719 B2 | 10/2007 | Conger |
| 7,367,606 B2 | 5/2008 | Ellis |
| 7,404,582 B2 | 7/2008 | Scartozzi et al. |
| 7,458,629 B2 | 12/2008 | Smith et al. |
| RE41,442 E | 7/2010 | Morgan et al. |
| 7,871,052 B2 | 1/2011 | Baum |
| 8,079,778 B2 | 12/2011 | Colkitt |
| 8,205,393 B1 | 6/2012 | Harrop |
| 8,375,643 B1 | 2/2013 | Harrop |
| 8,777,516 B2 | 7/2014 | Slutz |
| 2001/0048853 A1 | 12/2001 | Kozak |
| 2002/0034422 A1 | 3/2002 | Kozak |
| 2002/0166289 A1 | 11/2002 | Oviedo-Reyes |
| 2003/0124915 A1 | 7/2003 | Kaine et al. |
| 2004/0107985 A1 | 6/2004 | Weeks |
| 2004/0131454 A1 | 7/2004 | Voghel |
| 2006/0010783 A1 | 1/2006 | Evans |
| 2006/0065182 A1 | 3/2006 | Campbell et al. |
| 2006/0150537 A1 | 7/2006 | Baum et al. |
| 2007/0102951 A1 | 5/2007 | Chenowth |
| 2007/0266644 A1 | 11/2007 | Weicht |
| 2008/0141599 A1 | 6/2008 | Akdag et al. |
| 2008/0277961 A1 | 11/2008 | Smith et al. |
| 2008/0296186 A1 | 12/2008 | Daun et al. |
| 2009/0013610 A1 | 1/2009 | Glynos |
| 2010/0047020 A1 | 2/2010 | Lacey |
| 2010/0074688 A1 | 3/2010 | Renaud et al. |
| 2010/0278592 A1 | 11/2010 | Walker |
| 2011/0227363 A1 | 9/2011 | Smith et al. |
| 2012/0186620 A1 | 7/2012 | Holstrom |

FOREIGN PATENT DOCUMENTS

| | | |
|---|---|---|
| DE | 19913750 | 10/2000 |
| EP | 497179 | 8/1992 |
| GB | 2278374 | 11/1994 |
| JP | 4281907 | 10/1992 |
| JP | 2000167506 | 6/2000 |
| WO | WO 9950000 | 10/1999 |

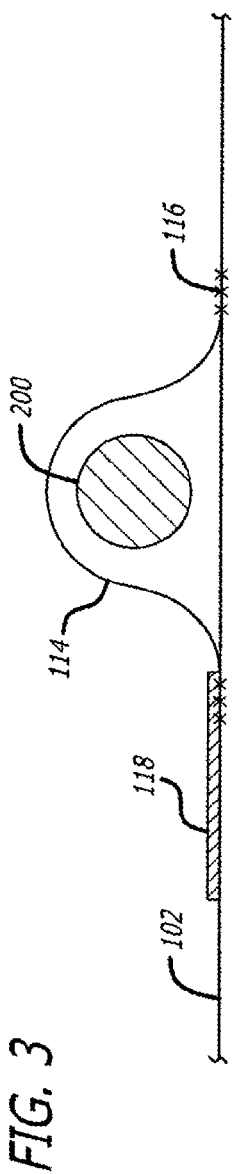
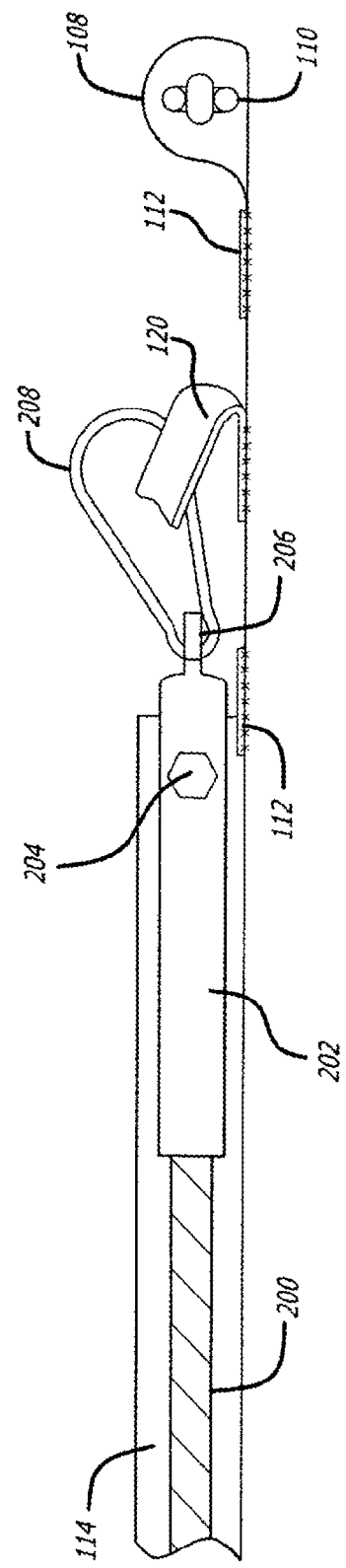
FIG. 3
FIG. 4

TARP AND BALLAST SYSTEM

BACKGROUND OF THE INVENTION

The present application is a continuation of U.S. application Ser. No. 13/524,083, filed Jun. 15, 2012 (now U.S. Pat. No. 8,777,516); which claims the benefit of U.S. Provisional Application No. 61/497,634, filed Jun. 16, 2011; all of which are incorporated by reference herein.

FIELD OF THE INVENTION

The present invention relates to improvements in the construction of, and ballast systems for, large industrial tarps, particularly those used in temporarily covering sanitary landfill sites.

DESCRIPTION OF THE RELATED ART

While the present invention is directed to improvements in the construction of, and ballast systems for, large industrial tarps generally, it is particularly well suited for use as a temporary landfill cover. Landfill operators are required to cover the working face of the landfill when the site is not being worked. That is, the working face must be covered to prevent debris from blowing away, minimize odor, and minimize access by pests and rodents. Traditionally, the working face is covered with a layer of soil. However, repeatedly covering the working face with soil requires a significant amount of time, and the soil occupies valuable space in the landfill. Therefore, many landfills have begun using large industrial tarps to temporarily cover the working face when it is not in use.

The tarps used as landfill covers must be very large in order to be able to cover the working face. As such, the tarps are generally fabricated by sewing together numerous panels of material, the length thereof corresponding to the width of the finished tarp. The tarps must also be able to withstand high-speed winds without being displaced. Accordingly, it is common for these tarps to include sleeves sewn across the width thereof along the seams connecting the panels. Weights, or ballasts, are inserted into these sleeves to keep the tarps in place. One type of ballast commonly used is a large diameter cable. Generally, a plurality of these cables are inserted into the sleeves running across the width of the tarp, and then both ends of the sleeves are sealed shut. When the tarp eventually wears out, the sleeves are cut open and the cables are removed and reinstalled in a new tarp. However, if the ends of the cable fray, they can damage the tarp and allow the cable to be dislodged from the sleeve. In addition, it can be difficult to withdraw and insert a cable that has frayed ends. Furthermore, it is tedious and time consuming to seal both ends of each sleeve after insertion and unseal one end of each sleeve prior to withdrawal of the cables.

These tarps are often deployed and removed using an Automatic Tarping Machine, such as the one disclosed in U.S. Pat. No. 5,304,014 to John D. Slutz, which is hereby incorporated by reference. Whether the tarp is deployed and removed using an Automatic Tarping Machine, or manually, the tarp is subjected to large forces along the length of the tarp (i.e., transverse to the seams connecting the panels). Accordingly, the panel seams are a common place for the tarps to tear. In addition, if the tarp is being deployed and removed with an Automatic Tarping Machine and a ballast cable becomes dislodged from it's sleeve, this can cause a danger to the equipment or the operator when the Automatic Tarping Machine is rotating. Furthermore, because the ballast cables serve an additional function of maintaining full extension of the width of the tarp, a dislodgement of a ballast cable can allow bunching of the tarp, thereby diminishing the functionality thereof.

Another common location where the tarps tear is the edge along the length of the tarp. This location on the perimeter of the tarp is often subjected to extraneous forces, for example, from being impacted by the wheels or tracks of heavy machinery working next to the tarp. Accordingly, it is imperative to maintain the integrity of the tarp material along the edges.

The present invention seeks to alleviate one or more of these problems by providing a tarp that eliminates the seams that run transverse to the length of the tarp and provides for a secure connection for the ends of the ballast cables that allow easy insertion and removal of ballasts without affecting the structural integrity of the tarp material along the perimeter thereof.

SUMMARY OF THE INVENTION

The present invention in one preferred embodiment is drawn to a large industrial tarp for use as a temporary landfill cover, constructed of a plurality of panels that are connected via seams oriented along the length of the tarp. The improved tarp has lengthwise ballast pockets, or chain pockets, at both sides of the tarp extending the length thereof. Both of the chain pockets have an elongated ballast, or length of chain fixed therein. The improved tarp also has a plurality of widthwise ballast pockets, or cable pockets, oriented in a direction transverse to the panel seams. The tarp also includes various reinforcement straps attached thereto. A first and second reinforcement strap are located proximate the chain pockets. Lateral reinforcement straps are attached across the width of the tarp, alongside each of the cable pockets. Finally, there are seam reinforcement straps attached to each of the panel seams proximate the ends of the tarp. The lateral reinforcement straps include a looped portion proximate the sides of the tarp. Each of the cable pockets houses an extended ballast, or a ballast cable therein, and the ballast cables have a cap on the ends thereof. The caps, and therefore the ballast cables, are attached via a fastener to the looped portion of the lateral reinforcement straps.

It is to be understood that both the foregoing general description and the following detailed description are exemplary and explanatory only and are not restrictive of the invention, as claimed.

The accompanying drawings, which are incorporated in and constitute a part of this specification, illustrate several embodiments of the invention and together with the description, serve to explain the principles of the invention.

BRIEF DESCRIPTION OF THE FIGURES

FIG. 3 is a cross-sectional view of portion 2 of the tarp shown in FIG. 2 taken along line 3-3.

FIG. 4 is a cross-sectional view of portion 2 of the tarp shown in FIG. 2 taken along line 4-4.

DETAILED DESCRIPTION OF THE INVENTION

Reference will now be made in detail to the present preferred embodiment of the invention, examples of which are illustrated in the accompanying drawings.

FIGS. 1 to 6 show a preferred embodiment of a tarp 100. In this preferred embodiment, tarp 100 is primarily configured to be used as a temporary cover for the working face of a landfill. Furthermore, tarp 100 is preferably configured to be used in conjunction with an Automatic Tarping Machine, such as the one disclosed in U.S. Pat. No. 5,304,014 to John D. Slutz. The preferred elements of tarp 100 and their interrelationship are described below.

Figure 1:
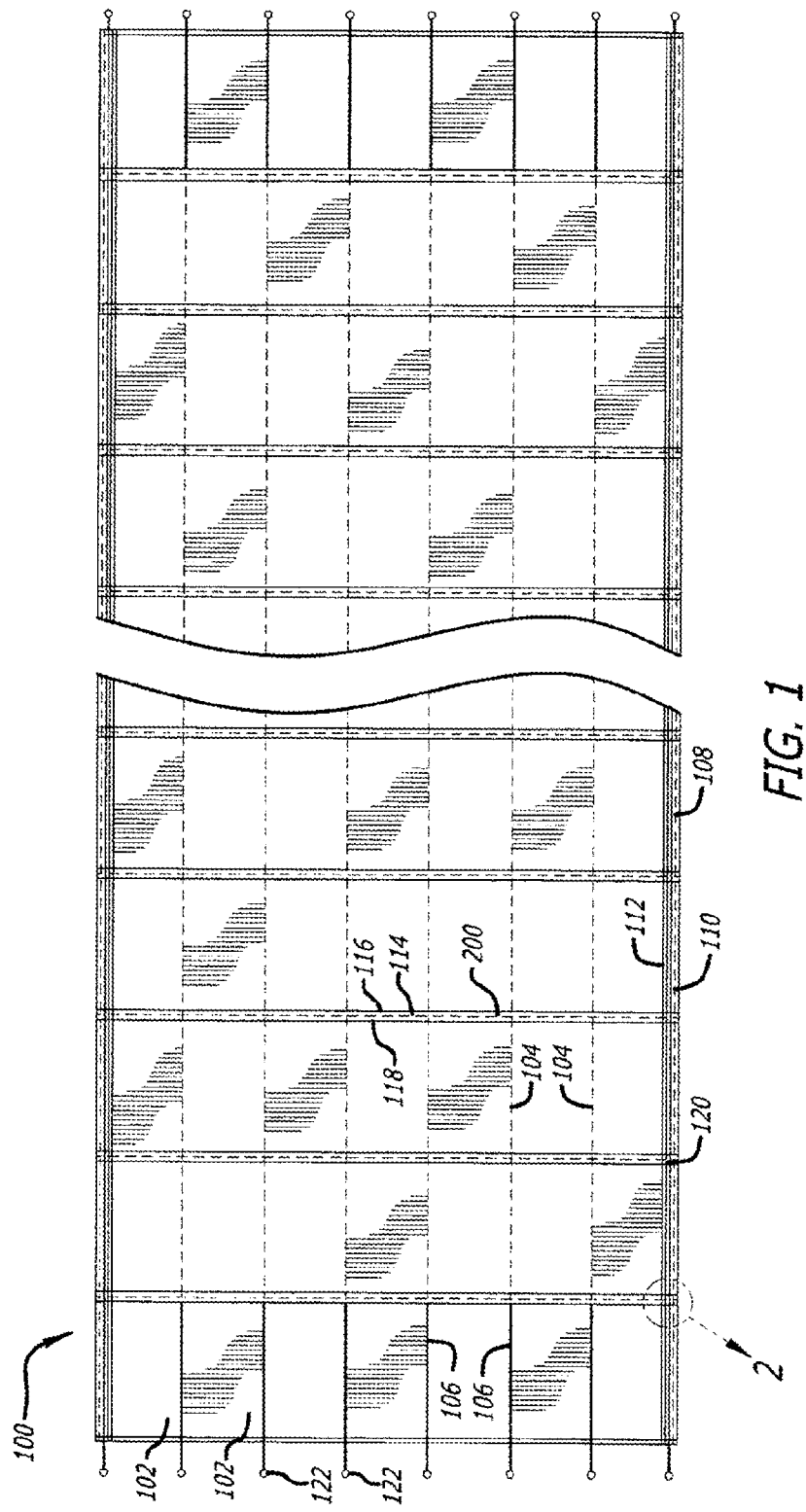
FIG. 1 is a top view of a tarp in accordance with a preferred embodiment of the present invention.
Figure 2:
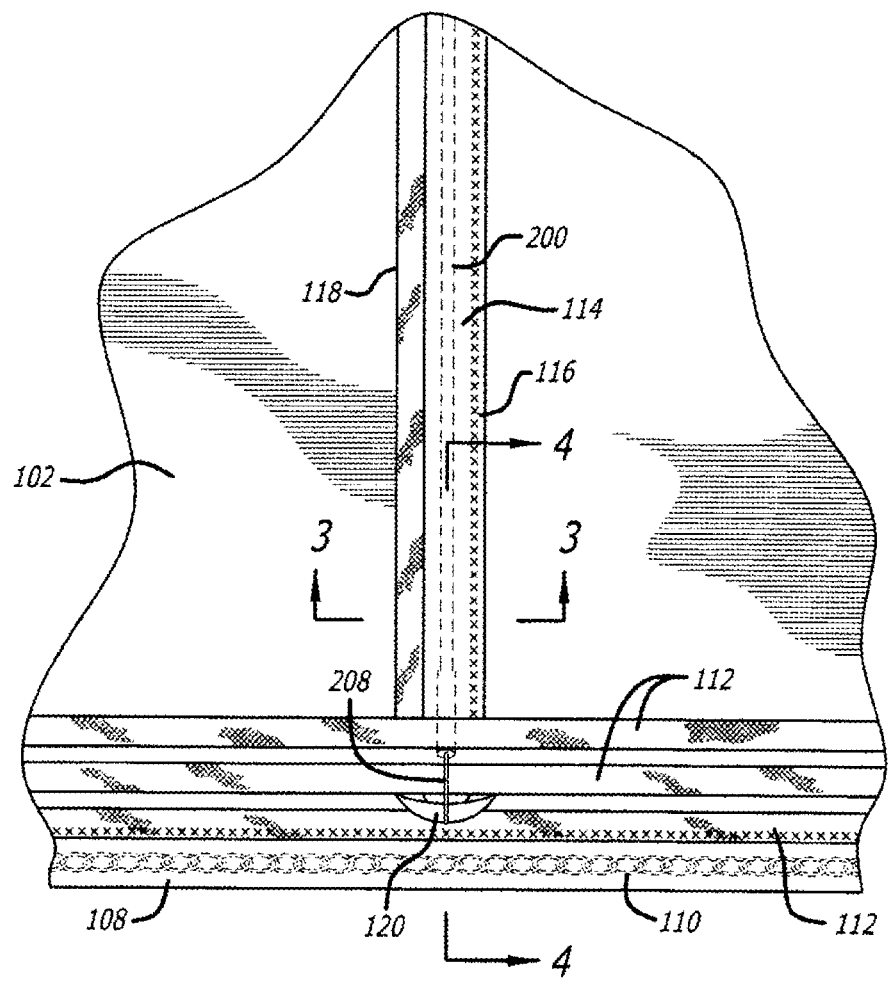
FIG. 2 is a detailed top view of a portion 2 of the tarp of FIG. 1.

Referring to FIG. 1, tarp 100 is constructed from a plurality of panels 102. Panels 102 are preferably sewn together along the lengths thereof, thereby creating panel seams 104 that run along the length of tarp 100. The lengths of panels 102 are approximately the same length as the overall length of tarp 100. Panels 102 may be attached to one another in other ways without departing from the scope of the present invention. Both ends of each panel seam 104 are bolstered by seam reinforcement straps 106, which are preferably sewn into panel seams 104. Optionally, seam reinforcement straps 106 may run the entire length of panel seams 104. Seam reinforcement straps 106 may extend beyond the ends of tarp 100, and may include a D-ring 122 at the free end of strap 106. D-rings 122 may be used to attach tarp 100 to adjacent tarps in order to cover a larger area or to anchor tarp 100 to the ground. D-rings 122 may also be used to attach tarp 100 to the Automatic Tarping Machine to facilitate deployment and removal of tarp 100 from the working face.

As shown in FIGS. 1, 2, and 4-6, the edges of panels 102 located at opposite sides of tarp 100 are folded over onto themselves along the length of tarp 100 and have a side reinforcement strap 112 sewn on top of the fold, thereby forming a lengthwise ballast pocket, or chain pocket 108, at each side of tarp 100. An elongated ballast, or a chain 110, may be housed within each chain pocket 108. Chains 110 act as ballasts to hold down the edges of tarp 100. Optionally, chains 110 may extend beyond the ends of tarp 100. If chains 110 do extend beyond the ends of tarp 100, they may be used to attach tarp 100 to the Automatic Tarping Machine to facilitate deployment and removal of tarp 100 from the working face. Similar to seam reinforcement straps 106, side reinforcement straps 112 may extend beyond the ends of tarp 100, and may include D-rings 122 at the ends of straps 112. In order to add additional strength, tarp 100 may include additional side reinforcement straps 112 sewn in a parallel orientation to one another.

Figure 5:
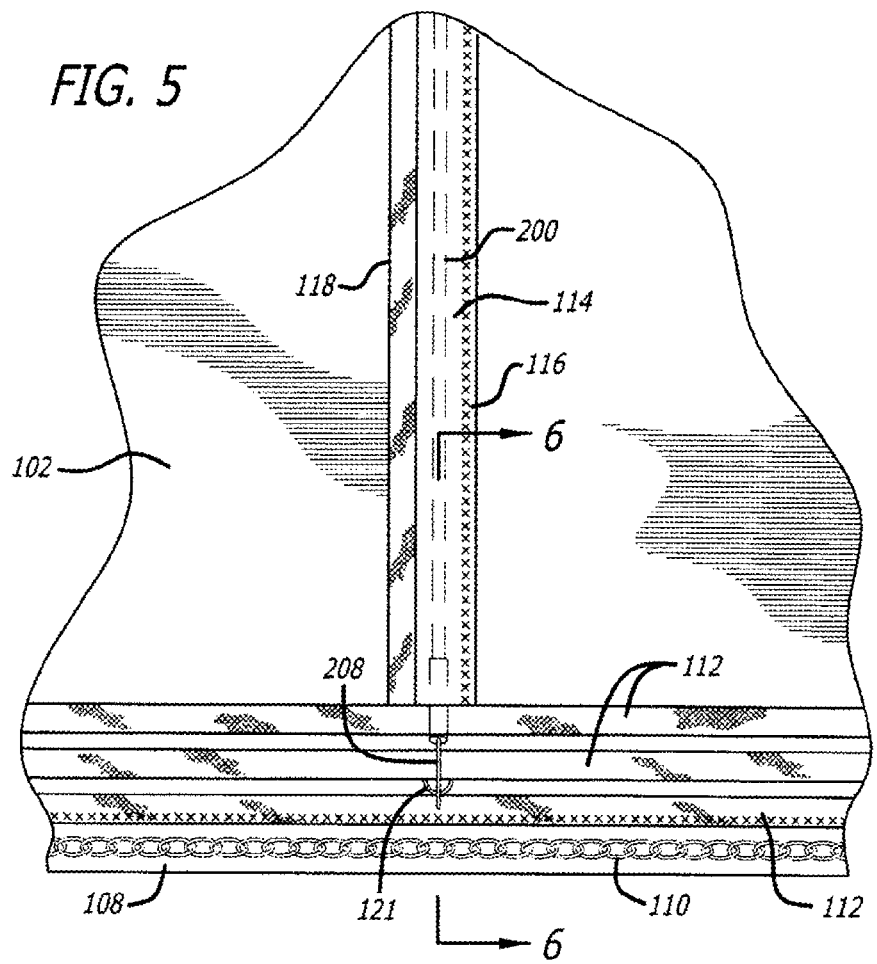
FIG. 5 is a detailed top view of portion 2 of the tarp show in FIG. 1 with an alternative ballast anchor.
Figure 6:
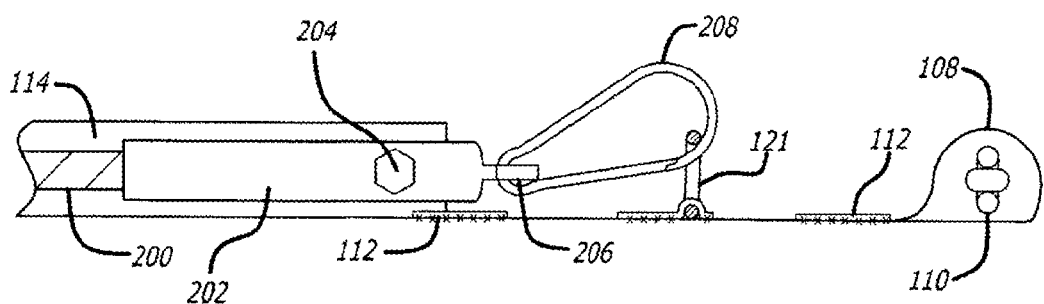
FIG. 6 is a cross-sectional view of the portion 2 shown in FIG. 5 taken along line 6-6.

FIGS. 1 to 4 show a plurality of widthwise ballast pockets, or cable pockets 114, formed by sewing strips of material to the top of tarp 100 across the width thereof. Each cable pocket is attached on one side with a cable pocket seam 116 and on the other side with a lateral reinforcement strap 118. Proximate the open ends of cable pockets 114 are ballast anchors. In one preferred embodiment, the ballast anchors are formed when both ends of each lateral reinforcement strap 118 extend beyond cable pocket 114 and are looped across the open ends of cable pocket 114 and sewn to one of side reinforcement straps 112, thereby forming strap loops 120. In another preferred embodiment, as shown in FIGS. 5 and 6, the ballast anchors are D-rings 121.

Cable pockets 114 are preferably large enough to allow for easy insertion of extended ballasts, or ballast cables 200 therein, while being small enough to prevent excessive movement of ballast cables 200 relative to cable pockets 114, so as to reduce abrasion of tarp 100 caused by friction. Ballast cables 200 are configured to provide lateral structure to tarp 100, in order to prevent tarp 100 from bunching, in addition to supplying sufficient weight to keep tarp 100 in place during high winds.

Each end of ballast cables 200 are inserted into a cable end cap 202. Cable end cap 202 is secured to the end of ballast cable 200 by inserting end cap bolts 204 into openings located on opposing sides of end cap 202. End cap bolts 204 are preferably threaded along the shaft thereof and are inserted into matching threaded, and countersunk, holes on cable end caps 202. Alternatively, end cap bolts 204 may be replaced with self-tapping screws which thread into ballast cables 200 upon insertion. Countersinking the holes on cable end caps 202 enables the heads of end cap bolts 204 to be recessed even with the surface of cable end cap 202, in order to eliminate abrasion of tarp 100 caused by end cap bolts 204. An alternative method of eliminating abrasion caused by end cap bolts 204, is to wrap end cap 202 and the heads of end cap bolts 204 with a cloth or scrim-backed pressure sensitive tape, such as, duct or gaffer tape. Furthermore, to reduce abrasion, it is preferred that all of the exposed edges and surfaces of end caps 202 are smooth and round. Cable end caps 202 have an opening 206, through which a fastener 208 is passed. Fastener 208 is then attached to either strap loop 120 or D-ring 121, thereby securing ballast cable 200 within cable pocket 114.

The tarp of the present invention may be made of a variety of materials. For example, the tarp panels are preferably made of a durable, flexible fabric such as canvas or polypropylene. The reinforcement straps are preferably made of a durable, flexible fabric, such as nylon or polyester webbing. The ballast cables are preferably made of a durable, non-corrosive, semi-rigid material, such as stainless steel cable. Optionally, the stainless steel cable may be coated with plastic or rubber to increase the durability thereof and decrease the likelihood of cable fray. The D-rings, the side chains, the end caps and bolts, and the cable fasteners are all preferably made of a durable, non-corrosive metal, such as stainless steel.

Preferred dimensions are set forth below, although it will be appreciated that the dimensions are representative only, and therefore, may be varied as suitable for the intended application. Tarp 100 is made of seven tarp panels 102, each of tarp panels 102 being about 6 ft. wide and 100 ft. long. The overlapped fabric in seams 104 and chain pockets 108 reduces the overall size of tarp 100 to about 40 ft. wide and 100 ft. long. Tarp 100 may be made of any number of tarp panels 102 of varying sizes so as to create any finished size desired. The preferred size of side chains 110 is a standard ⅜-in. chain cut to about 100 ft. long, so the chain runs the full length of tarp 100. The preferred size of ballast cables 200 is ⅞-in. diameter cable cut to a length of about 39 ft. long. Preferably, cable pockets 114 are located at 10-ft. intervals along the length of tarp 100. Cable pockets 114 may be spaced closer or farther apart depending on the conditions in which tarp 100 is to be used. Furthermore, while not required, cable pockets 114 may be included proximate the ends of tarp 100. The preferred width of reinforcement straps 106, 112, 118 is 3 in.

Having described the preferred components of tarp 100, a preferred method of use will now be described with reference to FIGS. 1 to 4. To set up tarp 100 for use in covering the working face of a landfill, ballast cables 200 are inserted in cable pockets 114 and fasteners 208 are attached to either strap loops 120 or D-rings 121. A specialized tool (not shown) may be used to install the ballast cables 200. The tool includes a smooth, bullet-shaped body with a diameter smaller than ballast cables 200 with a rope attached to a trailing end of the body. An opposite end of the rope is attached to fastener 208.

The body, given it's size and shape, is then easily slid through cable pocket 114. Finally, ballast cable 200 may then be pulled into cable pocket 114 using the rope attached to fastener 208. This initial setup step is only required before the first use of tarp 100; the ballast cables 200 remain installed until tarp 100 must be replaced. At which time, fasteners 208 are detached from either strap loops 120 or D-rings 121, and ballast cables 200 are removed from tarp 100, so they may be reused in a new tarp.

The present invention in a preferred form provides the advantages of extending the useable life of a landfill cover, and increasing the functionality and ease of use thereof.

The foregoing description is by way of example only, and may be varied considerably without departing from the scope of the present invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A tarp comprising:
   a first end and an opposite second end of said tarp, said tarp having a length between said first and second ends;
   a first side and an opposite second side of said tarp, said tarp having a width between said first and second ends, said length of said tarp being longer than said width of said tarp;
   a first lengthwise ballast pocket corresponding to said first side of said tarp and a second lengthwise ballast pocket corresponding to said second side of said tarp, each of said first and second lengthwise ballast pockets being configured to receive an elongated ballast therein;
   a first reinforcement strap proximate said first side and a second reinforcement strap proximate said second side, said first and second reinforcement straps extending at least from said first end to said second end of said tarp; and
   a plurality of widthwise ballast pockets extending from medial of said first reinforcement strap to medial of said second reinforcement strap, each of said plurality of widthwise ballast pockets having a first opening and a second opening, said first opening being located proximate said first reinforcement strap and said second opening being located proximate said second reinforcement strap, each of said plurality of widthwise ballast pockets adapted to accommodate an extended ballast therein, each of said plurality of widthwise ballast pockets having a lateral reinforcement strap adjacent thereto, each of said lateral reinforcement straps extending from medial of said first lengthwise ballast pocket to medial of said second lengthwise ballast pocket, each of said lateral reinforcement straps having a first ballast anchor and a second ballast anchor, said first ballast anchor being located lateral of said first opening and said second ballast anchor being located lateral of said second opening, wherein each of said first and second ballast anchors are adapted to be detachably engageable to a fastener that is attached to an end of an extended ballast.

2. The tarp of claim 1, wherein at least a portion of each seam proximate said first and second ends has a seam reinforcement strap attached thereto.

3. The tarp of claim 2, wherein said seam reinforcement strap has a D-ring attached thereto.

4. The tarp of claim 1, further including a plurality of extended ballasts inserted in said widthwise ballast pockets.

5. The tarp of claim 4, wherein each of said plurality of extended ballasts includes a first end cap and a second end cap attached to opposing ends of said extended ballast.

6. The tarp of claim 5, wherein each of said first and second end caps are detachably attached to said first and second ballast anchors, respectively, via a fastener.

7. The tarp of claim 6, wherein said fastener is a carabiner.

8. The tarp of claim 7, wherein said extended ballasts are cables.

9. The tarp of claim 1, wherein said tarp is configured for use with an automatic tarping machine.

10. The tarp of claim 1, further including at least one elongated ballast received within at least one of said lengthwise ballast pockets.

11. The tarp of claim 10, wherein said at least one elongated ballast is a chain.

12. The tarp of claim 1, wherein said first ballast anchor comprises a strap loop.

13. The tarp of claim 1, wherein said first ballast anchor comprises a D-ring.

14. A tarp comprising:
    a first end and an opposite second end of said tarp, said tarp having a length between said first and second ends;
    a first side and an opposite second side of said tarp, said tarp having a width between said first and second ends, said length of said tarp being longer than said width of said tarp;
    a plurality of ballast chains;
    a first chain pocket corresponding to said first side of said tarp and a second chain pocket corresponding to said second side of said tarp, said first and second chain pockets extending from said first end to said second end of said tarp, each of said first and second chain pockets having one of said plurality of ballast chains secured therein;
    a first reinforcement strap proximate said first side and a second reinforcement strap proximate said second side, said first and second reinforcement straps extending at least from said first end to said second end of said tarp;
    a plurality of cables; and
    a plurality of cable pockets extending from medial of said first reinforcement strap to medial of said second reinforcement strap, each of said plurality of cable pockets having a first opening and a second opening, said first opening being located proximate said first reinforcement strap and said second opening being located proximate said second reinforcement strap, each of said plurality of cable pockets having one of said plurality of cables therein, each of said plurality of cable pockets having a lateral reinforcement strap adjacent thereto, each of said lateral reinforcement straps extending from medial of said first chain pocket to medial of said second chain pocket, said first opening having a first ballast anchor located lateral of said first opening and said second opening having a second ballast anchor located lateral of said second opening, each of said cables including a first end cap and a second end cap attached to opposing ends of said cable, wherein each of said first and second end caps are detachably attached to said first and second ballast anchors, respectively, via a carabiner.

15. The tarp of claim 14, wherein said first ballast anchor comprises a strap loop.

16. The tarp of claim 14, wherein said first ballast anchor comprises a D-ring.

17. A method of temporarily covering the working face of a landfill comprising the steps of:
    providing a tarp that includes:

a first end and an opposite second end of the tarp, the tarp having a length between the first and second ends;

a first side and an opposite second side of the tarp, the tarp having a width between the first and second ends, the length of said tarp being longer than the width of said tarp;

a plurality of elongated ballasts;

a first lengthwise ballast pocket corresponding to the first side of the tarp and a second lengthwise ballast pocket corresponding to the second side of the tarp, the first and second lengthwise ballast pockets extending from the first end to the second end of the tarp, each of the first and second lengthwise ballast pockets being configured to receive one of said plurality of said elongated ballasts therein;

a first reinforcement strap proximate the first side and a second reinforcement strap proximate the second side, the first and second reinforcement straps extending at least from the first end to the second end of the tarp;

a plurality of extended ballasts; and a plurality of widthwise ballast pockets extending from medial of the first reinforcement strap to medial of the second reinforcement strap, each of the plurality of widthwise ballast pockets having a first opening and a second opening, the first opening being located proximate the first reinforcement strap and the second opening being located proximate the second reinforcement strap, each of the plurality of widthwise ballast pockets adapted to accommodate one of said plurality of extended ballasts therein, each of the plurality of widthwise ballast pockets having a lateral reinforcement strap adjacent thereto, each of the lateral reinforcement straps extending from medial of the first lengthwise ballast pocket to medial of the second lengthwise ballast pocket, the first opening having a first ballast anchor located lateral of the first opening and the second opening having a second ballast anchor located lateral of the second opening, wherein each of the first and second ballast anchors are adapted to be detachably engageable to a fastener that is attached to an end of each of said plurality of extended ballasts;

attaching the tarp to an automatic tarping device having a drum;

rolling the tarp on the drum of the automatic tarping device; and unrolling the tarp over the open face of the landfill.

18. The method of claim 17, wherein the first ballast anchor comprises a strap loop.

19. The method of claim 17, wherein the first ballast anchor comprises a D-ring.

* * * * *